Figure 1:
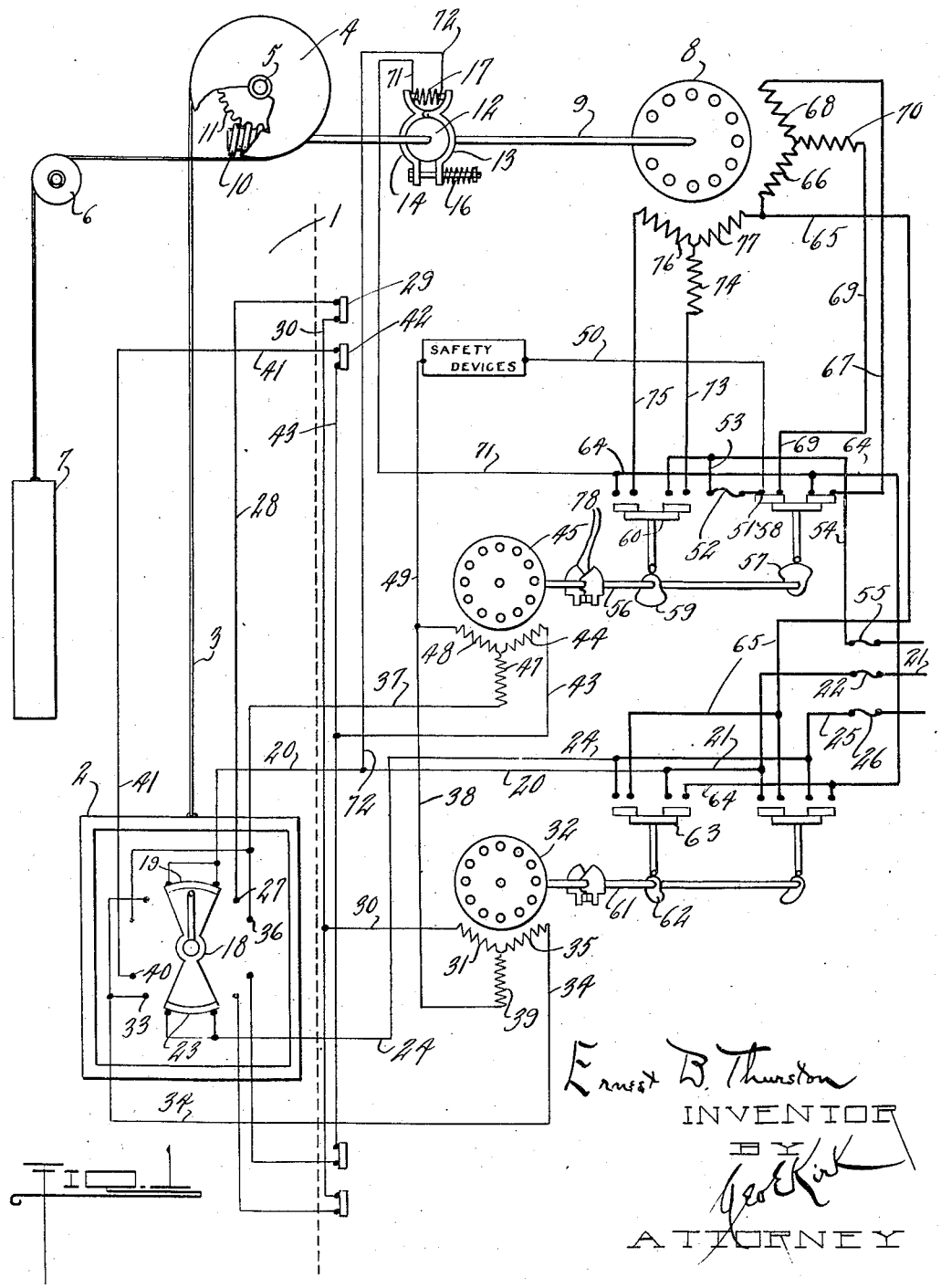

May 18, 1926.

E. B. THURSTON 1,585,519

MULTISPEED MOTOR PROTECTION

Filed Dec. 14, 1925    2 Sheets-Sheet 1

May 18, 1926.

E. B. THURSTON 1,585,519

MULTISPEED MOTOR PROTECTION

Filed Dec. 14, 1925    2 Sheets-Sheet 2

Ernest B. Thurston
INVENTOR
BY
ATTORNEY

Patented May 18, 1926.

1,585,519

UNITED STATES PATENT OFFICE.

ERNEST B. THURSTON, OF TOLEDO, OHIO, ASSIGNOR TO THE HAUGHTON ELEVATOR & MACHINE COMPANY, OF TOLEDO, OHIO, A CORPORATION OF OHIO.

MULTISPEED-MOTOR PROTECTION.

Application filed December 14, 1925. Serial No. 75,315.

This invention relates to multi-speed motor winding protection.

This invention has utility when incorporated in two-speed alternating current electric motors for safeguarding lower amperage low speed windings as coacting to preclude high speed winding connection when said amperage protection device has been effective to break the current to the low speed winding.

Figure 2:
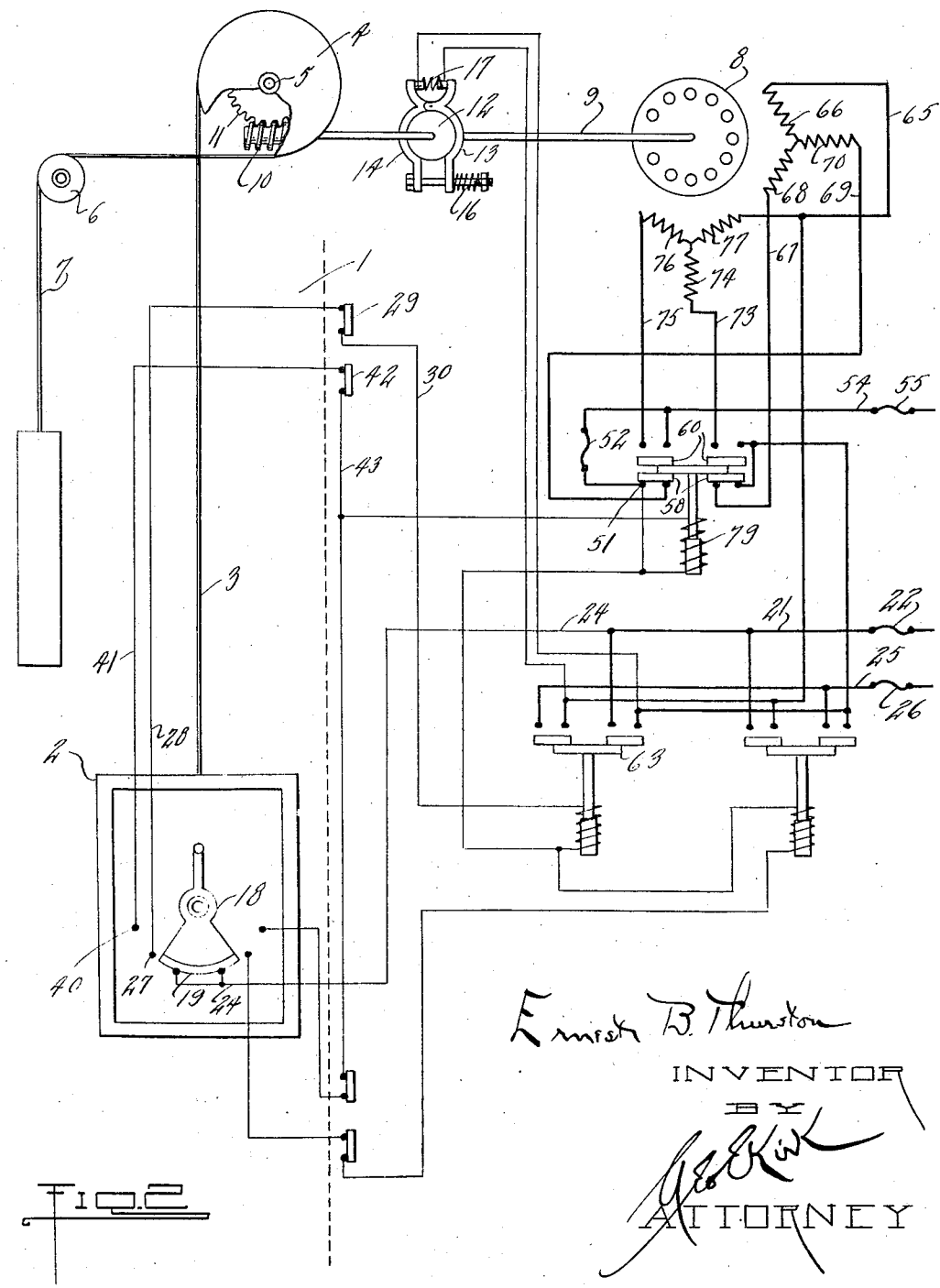

Referring to the drawings:

Fig. 1 is a wiring diagram of an elevator control system as operated by a two-speed squirrel cage type of induction motor having torque motor controls for its switches; and Fig. 2 is a wiring diagram of an elevator installation having a two-speed induction motor with solenoid switch control means.

Elevator well 1 is shown as having elevator car 2 therein suspended by hoist line 3 extending over drum 4 on shaft 5. This hoist line 3 extends from the drum 4 about idler 6 to counterweight 7. Motor 8 is shown as having shaft 9 provided with worm 10 in mesh with worm wheel 11 for operating shaft 5 and the drum 4. This shaft 9 is provided with brake drum 12 having brake shoes 13, 14, normally held against the drum by spring 16 against the action of coil 17.

In the car 2 is controller 18 having contact 19 connected by line 20 with power supply line 21 through normal fuse 22. This controller 18, remote from the contact 19 has contact 23 from which extends line 24 to power supply line 25 having fuse 26. In shifting the controller 18 to the right, contact 19 extends to terminal 27 having line 28 therefrom to upper stop limit switch 29, thence by line 30 to winding 31 of direction torque motor 32. At this position of the contact 19 extending to the terminal 27, the contact 23 extends to terminal 33 from which extends line 34 to winding 35 at the torque motor 32. Further shifting of the controller 18 brings the contact 19 to terminal 36 connected to line 37. Line 38 is to winding 39 as the third winding at the torque motor 32 for energizing this direction switch motor. As the contact 19 extends to the terminal 36, the terminal 23 extends to terminal 40 from which extends line 41 to upper slow down switch 42 thence by line 43 to winding 44 of main switch torque motor 45. The line 37 has connection to winding 47 of this main direction switch motor 45 while third winding 48 of this motor 45 as well as line 38 from the winding 39 of the motor 32, have connection by line 49 through safety device as elevator door, landing doors, speed switches, thence by line 50 to terminal 51 through fuse 52 to line 53 as a branch of line 54 extending to fuse 55 in such line as a supply line.

Accordingly, the main switch motor 45 is energized to operate its shaft 56 and thus may be effective through cam 57 for opening normally closed low speed switch 58 and through cam 59 to effect closing of high speed switch 60. However, before the opening of this switch 58, direction switch motor 32 has been energized and operates its shaft 61, having cam 62 for throwing up direction switch 63 into closed position for delivering supply current from the line 21, having the main fuse 22, to the switch 63 and thence by line 64 to the low speed switch 58. Simultaneously, this switch 63 connects power current from the line 25, having the main fuse 26, to line 65 extending to low speed winding 66 at the motor 8. The low speed main switch 58 connects the line 64 to line 67 extending to low speed motor winding 68. The supply line 54 having main fuse 55 therein, extends by way of branch line 53 and fuse 52 to the terminal 51 at the low speed main switch 58 to be there connected by line 69 extending to low speed winding 70 at the motor 8.

From the line 64 extends branch line 71 to brake magnet coil 17 while from the line 20 extends branch line 72 to this brake magnet coil 17. Accordingly, as the motor 8 is energized for low speed driving operation in up direction, the brake drum 12 is released against the action of the spring 16 for allowing the car 2 to ascend at low speed.

Shifting of the controller 23 to reach terminal 40 may be simultaneous or somewhat after the terminal 36 is reached, and energizes the main switch motor 45 for so operating the shaft 56 that the low speed main switch 58 is opened and the main high speed switch 60 is closed. This connects the lines 54 to by-pass the fuse 52 and have connection by line 73 to high speed winding 74 for the motor 8. The line 64 is connected by this high speed main switch 60 to line 75 extending to high speed winding 76, while the line 65 is connected to the high speed winding 77. Accordingly, the motor 8 is connected in for high speed up direction travel.

In the multi-speed motor operations, more particularly as in connection with alternating current, the amperage consumption in the line is higher as a load is thereon and the power consumption taken for the high speed in such picking up of the load is considerably greater than for the low speed. The main supply power lines 21, 25, 54, are provided with fuses 22, 26, 55, of the capacity for protecting the high speed windings 74, 76, 77. Such fuse capacity as safeguarding high speed winding is too great for safeguarding the low speed windings 66, 68, 70. Furthermore, it is desirable in two-speed motor operation, especially in elevator work, that the failure of a fuse due to high current shall not be instantaneous, but that there may be some shifting of the car 2 at current consumption which, if maintained, would blow the fuse. This time interval is accurately and economically provided in a fusible type of current breaking over-load device.

As illustrative of conditions, a motor may at low speed in running have 50 ampere current comsumption, while on starting its current consumption may run up to 70 amperes. The high speed winding for such motor may have as its full load current say 85 amperes with its starting currents running to 170 amperes, nearly two and one-half times the starting current for the low speed and over three times the running current requirement for low speed. This great disparity of current between the windings is cared for herein by the over-load safety provided by the fuse 52 which has the time interval of such duration that there may be control of the car 2. This power disturbance deenergizes switch motor 32 by cutting off current in winding 39 and also deenergizing the main switch motor 45 for the winding 48 has no current so that this motor 45 is at once thrown by its lifted counterweight 78, as further loaded by the switch 60, to open the switch 60 and close the low speed switch 58 as the direction switch has opened. This blown fuse 52, as thus deenergizing the main switch motor 45 precludes completion of any current at the closure of the low speed switch 58. Accordingly, there is not only accomplished by this lower fuse 52 as compared with the fuses 22, 26, 55, a safe guarding of the low speed windings 66, 68, 70, of the motor 8, but a provision against starting such motor 8 on high speed.

As the direction motor 32 and main switch motor 45 are deenergized, when one of the lines therefrom has its circuit broken, such electromagnetic control means for the switch is back of the fuse 52, operates in a similar manner to solenoid 79 as shiftable from low speed switch closing position upward to high speed main switch closing position in Fig. 2.

In the disclosure herein, effort has been made to set forth the utility in the location of the fuse 52 in one of the power supply lines of a three phase alternating electric current circuit as supplied to a two speed motor. This fuse is not for the current to the high speed winding of the motor, which high speed connection from this power current line by-passes this fuse 52. Accordingly, as set forth herein, the fuse 52 is in the power connection for one of the phases to the low speed winding, and, furthermore, is in the remote control circuit as to this phase for controlling the high speed as well as other switches. Accordingly, there is safety or protective value as more specifically brought out hereinbefore.

What is claimed and it is desired to secure by United States Letters Patent is:

1. A motor having high and low speed windings, a high speed switch for the high speed winding, a low speed switch for the low speed winding, electromagnetic means for operating the high speed switch, and electric conducting means between said switches providing an overload current circuit breaking means in said conducting means, said electromagnetic means being connected to said conducting means on the side of said circuit breaking means toward said low speed switch.

2. A motor having high and low speed windings, a high speed switch for the high speed winding, a low speed switch for the low speed winding, and electromagnetic means for operating the high speed switch, and a line conductor extending from a source of energy to the motor and for operating the high speed switch including a fuse therein adapted to connect the low speed switch and also the electromagnetic means for operating the high speed switch to said source.

3. A multi-speed motor having switches, power conductors to said switches, electrically operable means for closing a higher speed switch and connected to a conductor to the lower speed switch from the higher speed switch, and a fuse in said conductor connecting said switches.

4. A two-speed alternating current electric motor, a main high speed switch for the motor, a low speed switch for the motor, a fuse between said switches, and high speed switch operating means connected through said fuse to the low speed switch.

5. A motor having different capacity windings, switches for said windings, power conductors to said switches, electrically operable means for closing a higher capacity winding switch and connected to a conductor to a lower capacity winding switch from a higher capacity winding switch, and a fuse in said conductor connecting said switches.

6. A motor having different capacity windings, switches for said windings, additional direction switches for the motor, power conductors to said switches, electrically operable means for selecting a direction switch and for closing a higher capacity winding switch and connected to a conductor to a lower capacity winding switch from a higher capacity winding switch, and a fuse in said conductor connecting said higher capacity switch, said electrically operable means and lower capacity switch.

In witness whereof I affix my signature.

ERNEST B. THURSTON.